United States Patent [19]

Geisthoff et al.

[11] 4,018,451
[45] Apr. 19, 1977

[54] TRACTOR THREE-POINT CONNECTION HAVING LEAF SPRINGS

[75] Inventors: Hubert Geisthoff; Wilhelm von Allwörden, both of Lohmar, Germany

[73] Assignee: Jean Walterscheid GmbH, Lohmar, Rhineland, Germany

[22] Filed: July 28, 1975

[21] Appl. No.: 599,790

[52] U.S. Cl. .......................................... 280/461 A
[51] Int. Cl.² .......................................... B60D 1/16
[58] Field of Search ...... 280/456 A, 460 A, 461 A; 172/439, 450, 272

[56] References Cited

UNITED STATES PATENTS 3,220,751  11/1965  Tweedale ...................... 280/461 A
3,889,980  6/1975  Geisthoff ...................... 280/461 A Primary Examiner—Robert R. Song
Assistant Examiner—R. Schrecengost
Attorney, Agent, or Firm—Edmund M. Jaskiewicz

[57] ABSTRACT

A three-point connection on a tractor comprises an upper guide member and a pair of lower guide members and coupling hooks on each of the guide members. A pair of leaf springs are connected between the upper guide member or a traverse bar on the upper guide member and the lower guide member coupling hooks. The leaf springs are each curved in the direction in which it is desired that the leaf springs bend when forces are applied to the ends of the springs.

9 Claims, 14 Drawing Figures

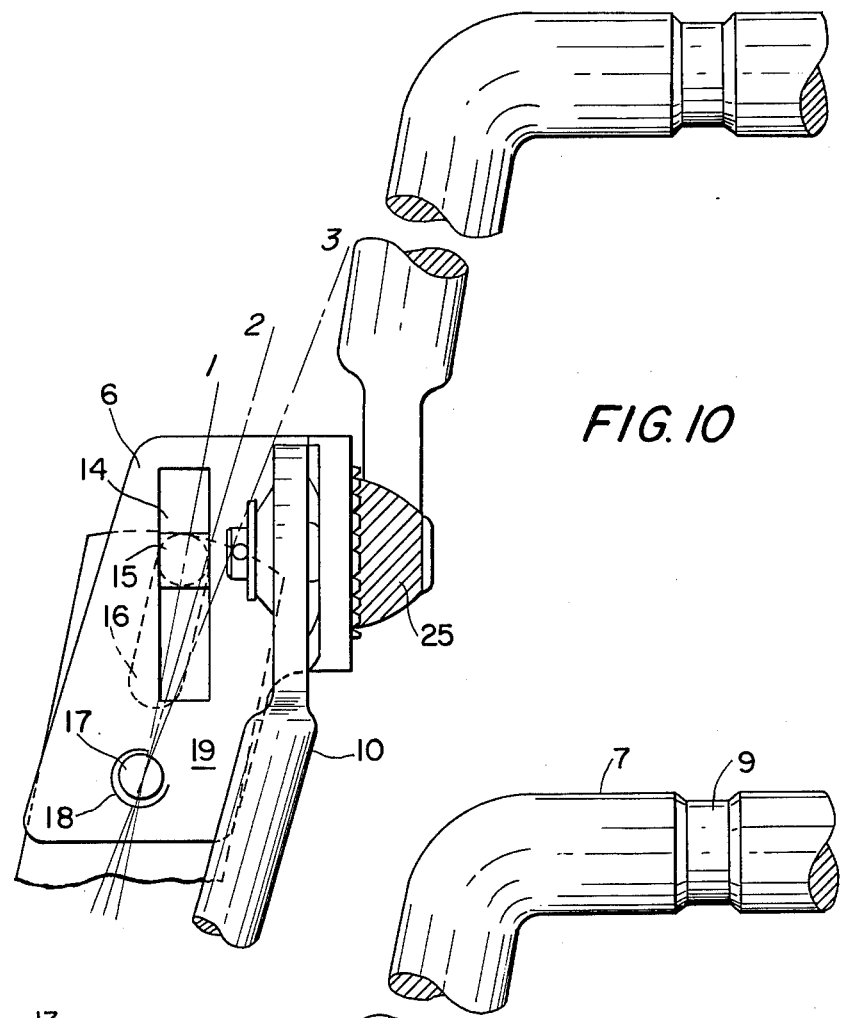
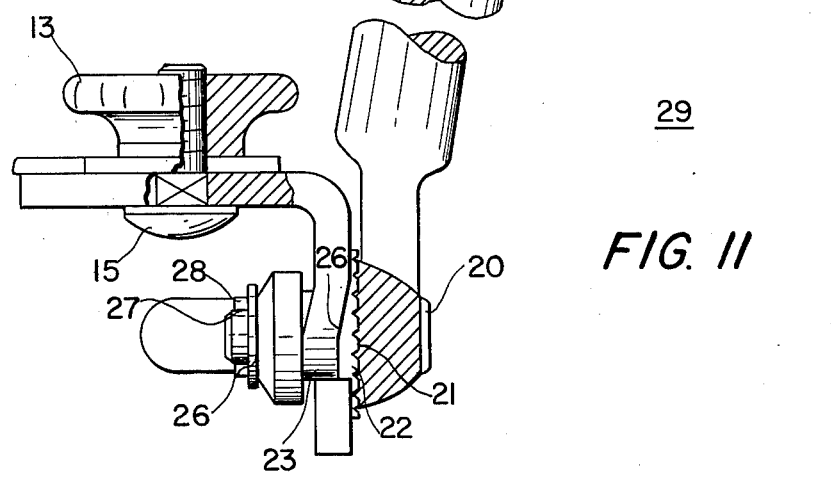

TRACTOR THREE-POINT CONNECTION HAVING LEAF SPRINGS

The present invention relates to a three-point connection on a tractor for coupling implements and the like to the tractor, more particularly, to such a connection wherein the upper and lower guide members are interconnected by leaf springs.

One form of a connection on a tractor for coupling implements and the like to the tractor comprises an upper guide member and pair of lower guide members below the upper guide member and connected to a power drive through lifting rods. The upper and lower guide members are resiliently supported at a predetermined distance from each other so as to be relatively moveable in both directions. A coupling hook is mounted on each of the upper and lower guide members.

The coupling hook on the upper guide member is generally pivotally mounted thereon. The upper guide members is generally maintained at a predetermined relationship to the lower guide members by means of a telescopic frame comprising two substantially vertically arranged telescoping supporting members spaced with respect to each other and a traverse member connecting the supports in the transverse direction. The upper guide member coupling hook is resiliently supported so as to be relatively moveable in both directions along the telescopic supports and can be displaced laterally by means of the traverse. Each coupling hook can be locked and the longitudinal adjustment of the upper guide member can be locked jointly by actuating a release cable or the like.

The telescopic supports are provided with guide rods that are detachably connected to the pockets of the coupling hooks on the lower guide members. The vertical distance between the upper and lower guide members can be adjusted in a known manner utilizing such a resilient telescopic frame so that the vertical distance between the coupling hooks of the upper and lower guide members is greater than the vertical distance between the connection points on the implement which is to be connected.

During operation of coupling the implement to the tractor, the upper connection point of the implement is initially approached by backing the tractor toward the implement. Lateral alignment is achieved because of the laterally moveable mounting of the upper guide member coupling hook and vertical pivoting movement is attained by actuation of the power drive which lifts the lower guide members by means of the lifting rods. The upper guide member is lifted at the same time because of the telescopic frame connection between the lower guide members and the upper guide member. After the upper coupling hook engages and is locked on the upper connection point of the implement the lower guide members are lifted further. The resilient telescopic frame permits a relative movement between the upper and lower guide members. After the lower connection points on the implement are engaged by the coupling hooks on the lower guide members the coupling operation is completed. Uncoupling of the implement from the tractor is achieved in the reverse manner after unlocking of the coupling hooks.

One disadvantage of the known tractor connection as described above is that such a connection is expensive because of the number and different kinds of components embodied therein. In addition, the telescopic tube supports are susceptible to damage because of the rugged treatment commonly encountered in agricultural operations. For example, should the telescopic tube support become bent, the operation of the tractor connection becomes questionable.

A further disadvantage is that the overall length of the traverse extends the entire width of the implement categories 1 to 3 and thus severely limits free lateral space in the vicinity of the upper guide member. It thus becomes extremely difficult for the operator to mount the tractor from behind.

Another disadvantage of this known tractor connection is that when the tractor is used to tow a trailer the three-point connection must be lifted and locked in raised position on the fenders of the tractor since the connection cannot be removed. This also limits the freedom of movement of the operator in the rear portion of the tractor.

In other forms of known tractor connections the struts or braces which interconnect the upper and lower guide members form a triangular frame. This frame greatly restricts access to the trailer or implement coupling and to the coupling of the power takeoff shaft. Further, such three-point connection must be removed when the tractor is used to tow a trailer. These features are considered disadvantageous when viewed in the light of safety and efficiency of operation.

It is therefore the principal object of the present invention to provide a novel and improved tractor connection which is simple in construction and operation and is sufficiently rugged to withstand rough operation.

It is another object of the present invention to provide such a tractor connection wherein the supports maintaining the spacing between the upper and lower guide members are not loaded by coupling forces and the connection is adapted to agricultural machines and implements having asymmetrically positioned coupling points.

It is a further object of the present invention to provide such a tractor connection which eliminates adjustment of the connection to different levels of connection points on implements and adjustment to the different widths of various categories of implements.

It is an additional object of the present invention to provide such an attachment which provides a maximum free space on both sides of the upper guide member.

It is still another object of the present invention to provide such a tractor connection that when used to tow a trailer the connection can remain on the tractor.

According to one aspect of the present invention a three-point connection on a tractor for coupling implements and the like to the tractor may comprise an upper guide member and a pair of lower guide members below the upper guide member. Coupling hooks are provided on each of the upper and lower guide members. There are also a pair of leaf springs each of which has its upper end non-pivotally connected to the upper guide member and its lower end connected to the lower guide member coupling hook. The leaf springs are each curved in such a direction that when a force is applied to an end of a leaf spring, the leaf spring will bend in a pre-determined direction.

There may also be provided a traverse bar on the upper guide member and the upper ends of the leaf springs are connected to the traverse bar.

The vertical distance between the upper and lower guide members is thus established by use of the pre-bent leaf springs and this vertical distance is greater than the vertical distance between the connection points on the implement which is to be connected.

During the coupling operation, the upper connection on the implement is initially approached by backing the tractor toward the implement and the lower guide members are lifted through the lifting rods. The lifting of the lower guide members causes the upper guide member to be raised because of the interposed leaf springs. After the upper guide member has been engaged and locked in position with respect to the upper connection point of the implement, the lower guide members are further lifted since the curved leaf springs permit relative movement between the upper and lower guide members. After the lower connection points on the implement have been engaged by the coupling hooks of the lower guide members and locked, the coupling operation is completed. Coupling is achieved by carrying out the reverse of the above procedure after the coupling hooks have been unlocked by actuation of the control cable.

A further advantage of the present invention is that the supporting structure between the upper and lower guide members need not absorb any loads since substantially no forces are exerted by the leaf springs and the upper connection point of the implement is being approached by the tractor moving in the reverse direction.

Other objects and advantages of the present invention will be apparent upon reference to the accompanying description when taken in conjunction with the following drawings, which are exemplary, wherein;

FIG. 10 is a front elevational view in enlarged scale of a portion of the connection of the present invention showing the structure for adjusting the height and width;

FIG. 11 is a top plan view of FIG. 10 with portions thereof in section;

Proceeding next to the drawings wherein like reference symbols indicate the same parts throughout the various views a specific embodiment and modifications of the present invention will be described in detail.

Figure 1:
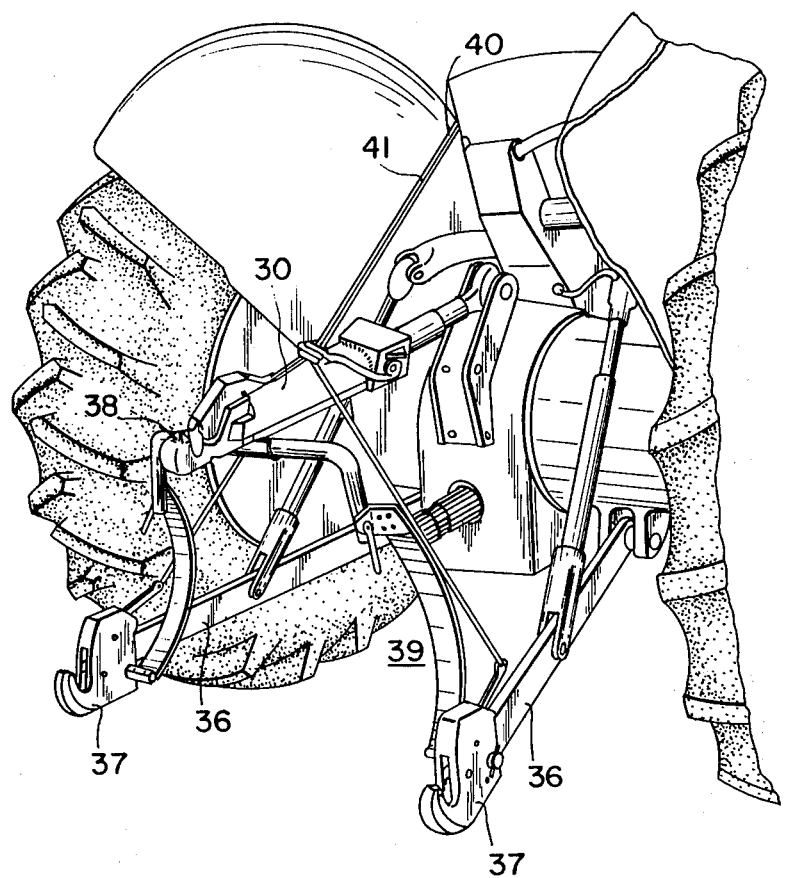
FIG. 1 is a perspective view of the rear portion of a tractor incorporating the connection of the present invention.
Figure 12:
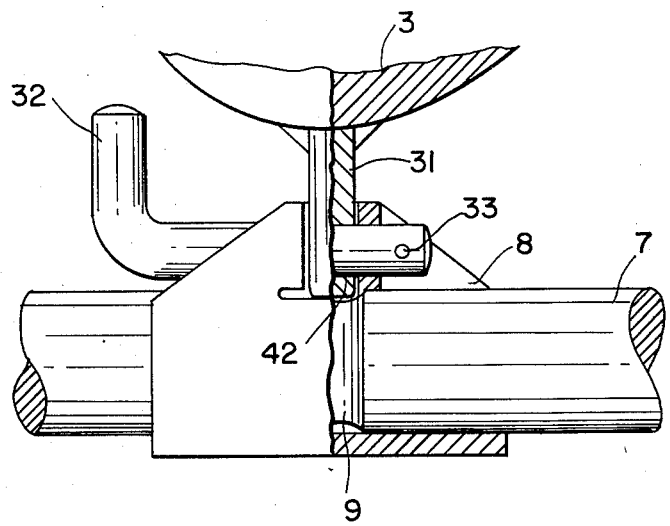
FIG. 12 is an elevational view partially in section in enlarged scale showing the attachment of the upper guide member to a traverse bar.
Figure 13:
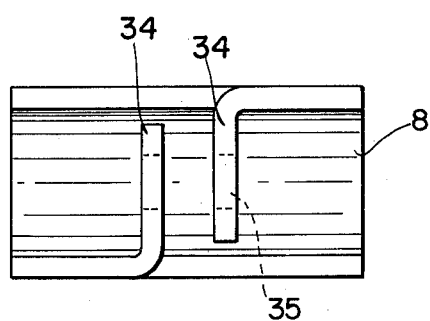
FIG. 13 is a top plan view of the upper guide member holder shown in FIG. 12; and, FIG. 14 is a side elevational view of the holder of FIG. 13.
Figure 14:
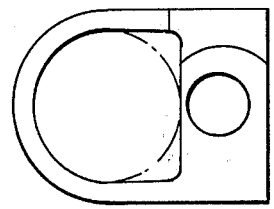

As may be seen in FIG. 1, a tractor is provided with an upper guide member 30. A pair of lower guide members 36 are positioned below the upper guide member 30 and are interconnected to the upper guide member by means of a supporting frame indicated generally at 39 and comprising a pair of leaf springs according to the present invention. On the lower surface of the upper guide member 30 is a support rail or bar 31 which is connected to a supporting frame holder 8 as shown in FIG. 12. The holder is substantially cylindrical and has formed in its upper surface a pair of parallel side bars 34 having openings 35 through which is passed a securing pin 33 having a bent blocking end 32. The securing pin 33 also passes through a suitable opening in the support rail 31. The lower edge of the support rail 32 forms a lock 42 by engaging an angular groove 9 in a traverse bar 7 so as to secure the traverse bar 7 and upper guide member 30 against relative lateral displacement. The ends of the traverse bar 7 are bent at right angles to each other and a traverse adjustment structure 29 is provided on both ends of the traverse bar.

Figure 2:
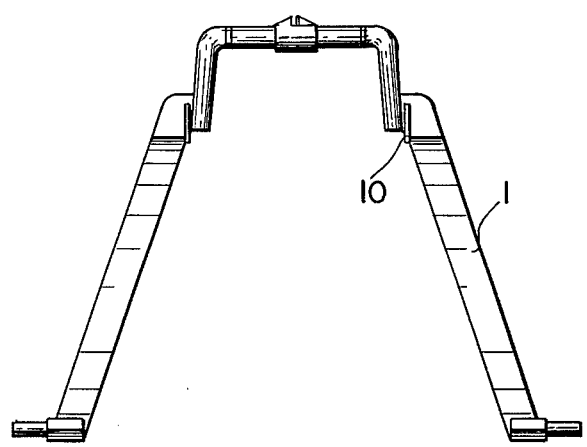
FIG. 2 is a front elevational view of the tractor connection according to the present invention and showing the curved leaf springs extending obliquely in a lateral direction.
Figure 3:
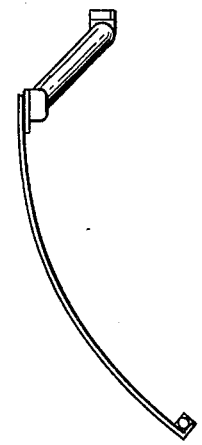
FIG. 3 is a side elevational view of the connection of FIG. 2.

Leaf springs 1 which interconnect the upper and lower guide members and are shown in greater detail in FIGS. 2 and 3 extend substantially in a vertical direction and are disposed at a distance from each other which corresponds to the space between the lower guide members 36. The leaf springs 1 are interconnected to each other through the traverse bar 7 and the upper ends of the leaf springs are rigidly and non-pivotally connected to the traverse bar in such a manner that adjustment of the leaf springs is possible in the manner to be presently described. The leaf springs 1 are pre-formed with a curvature such that the springs curve toward the operator's seat and transmission box of the tractor. Thus, should the leaf springs be subjected to a load a yielding of the leaf springs will occur in the predetermined direction toward the tractor and a dead center will not be formed.

The lower ends of the leaf springs are provided with a screw-like swing extending laterally to the lower guide members 36 and the lower ends of the leaf springs are pivotally connected to the coupling hooks 37 on the lower guide members 36.

As may be seen in FIG. 2, the length of the traverse bar 7 is less than the distance between the lower guide members 36 such that the leaf springs 1 extend obliquely to the lower guide members. The oblique arrangement of the leaf springs thus provides a considerable amount of free space on both sides of the upper guide member which free space is significantly greater than the space available in previously known tractor connections.

Figure 4:
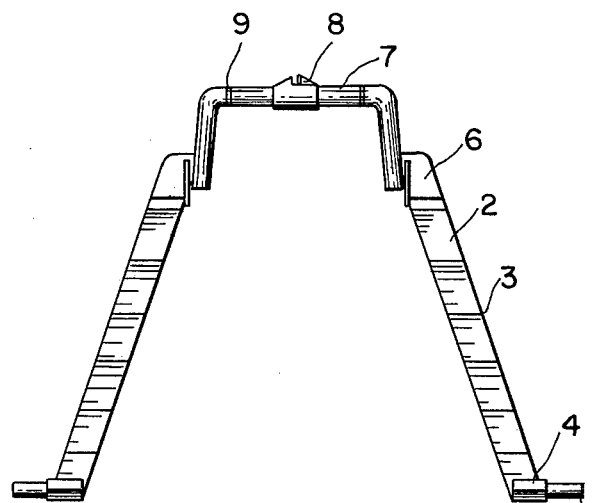
FIG. 4 is a front elevational view of a connection similar to that of FIG. 2 but wherein the leaf springs are provided with additional stabilizing adges.
Figure 5:
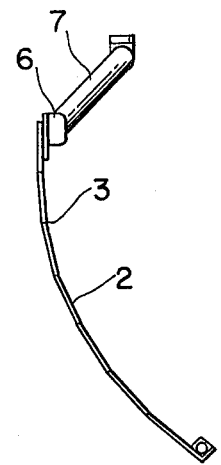
FIG. 5 is a side elevational view of the connection of FIG. 4.
Figure 6:
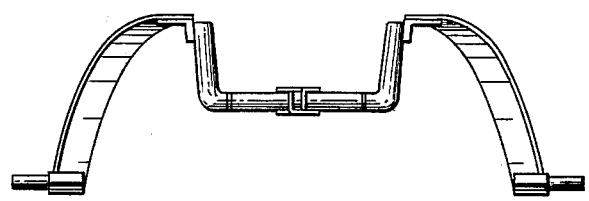
FIG. 6 is a top plan view of the connections of FIGS. 2 and 4.

As may be seen in FIGS. 4 and 5, pre-bent leaf springs 2 are provided each of which is further provided with a plurality of stabilizing chamfered edges 3 which are parallel to each other and extend in the plane of bending. The lower ends of the leaf springs 2 and 1, and also 11 as will be further described, are formed with a spring-bearing bore 4 in which is received a connection pin 5 for connection with the lower coupling hooks 37. Also, the lower ends of the leaf springs are provided with a screw-like swing which extends laterally to the lower guide members 36.

By constructing the leaf springs 2 with the chamfered edges 3 and the screw-like swing extending from the traverse bar laterally downward to the lower guide members provides for considerable lateral stability which permits coupling of an implement to the tractor with a minimum of problems. It is to be noted that simple leaf springs which are not pre-bent and which extend obliquely from the traverse bar to the lower guide members will be deflected laterally to such an extent that the lower connection points on the implement can no longer be engaged by the lower coupling hooks on the tractor.

The upper ends of the leaf springs are connected to the ends of the traverse bar 7 by means of mounting plates 6. The traverse bar 7 has ends 25 each of which is provided with a circular indented surface 21 which engages a corresponding indented surface 22 on the mounting plate 6. A bolt 20 interconnects traverse bar end 25 and mounting piece 6.

The bent portion of mounting plate 6 which faces the end of the traverse bar is provided with two locking surfaces 23 which comprise raised portions with the rises beginning in the clock-wise direction. These locking surfaces are in the form of circular sectors and extend radially to the bore through which the bole 20 passes. The locking surfaces 23 are positioned opposite each other and each occupies about one-fourth of the circular base surface. A locking lever 10 is positioned between the two locking surfaces and is pivotable about the bole 20. A cup spring 26 is provided to urge the lever 10 against mounting piece 6. The cup spring 26 is secured in a bore 27 by a clamping pin 28. Locking surfaces 24 which are similar to the locking surfaces 23 are provided on the side of the locking lever 10 which faces the locking surfaces 23 on the mounting piece 6. However, the oblique planes of the locking surfaces 24 extend in the opposite direction and the locking surfaces 23 and 24 can be rotated with respect to each other by means of the locking lever 10.

In addition to the traverse adjustment 29, the mounting piece 6 is provided with a category setting device indicated generally at 19 by means which the distance between the leaf springs can be adjusted. The adjusting device 19 is mounted on the main portion of mounting piece 6 which is at right angles to the bent portion connected to the traverse bar. As may be seen in FIG. 10, there is provided a vertically extending adjustment guide slot 14 and underneath the slot is a bore 18 within which is pivotally received a pivot pin 17 on the leaf spring. The upper end of the leaf spring is also provided with an adjustment slot 16 and a slide bolt 15 passes through the slots 14 and 16 and can be locked in an adjusted position by means of lock nut 13 on the threaded end of bolt 15.

As can be seen in FIG. 10, the lateral position of the leaf springs can be adjusted to different widths or categories as indicated by the numerals 1-3 associated with the center lines. Thus, the leaf springs are not only pivotable toward and away from each other but also pivotable about the traverse bar 7 or about axes parallel to the traverse bar. The leaf springs can thus be positioned to the different lateral distances of the lower connection points on implements. It is also possible to pivot the leaf springs inwardly and then pivot the leaf springs about the axis of the traverse bar to secure the raised leaf springs to the tractor together with the upper guide member so as to increase the free and unobstructed space in the rear portion of the tractor. If it is desired not to use the connection device when a trailer is being towed by the tractor the connection can be folded to one side in a manner as described above so as to save space without the necessity of removing the entire connection. The leaf springs can also be adjustable in stages to different heights of the connection points on implements and to different spaces between the lower connection points on implements. Further, the pivoted positions of the leaf springs can be locked in position by the devices 19 and 29 as illustrated in FIGS. 10 and 11 and described above.

Figure 7:
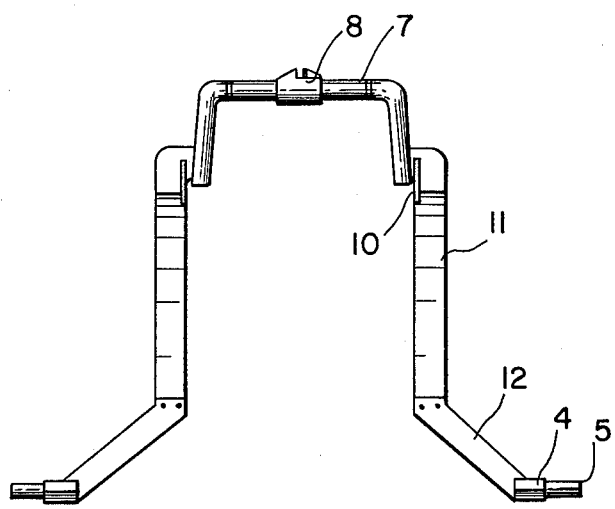
FIG. 7 is a front elevational view of a connection incorporating substantially vertically extending pre-bent leaf springs.
Figure 8:
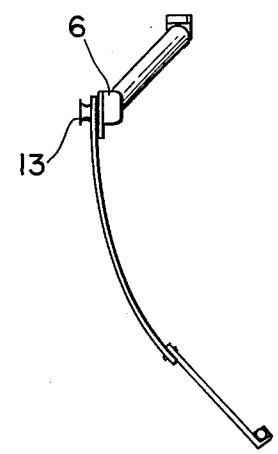
FIG. 8 is a side elevational view of FIG. 7.
Figure 9:
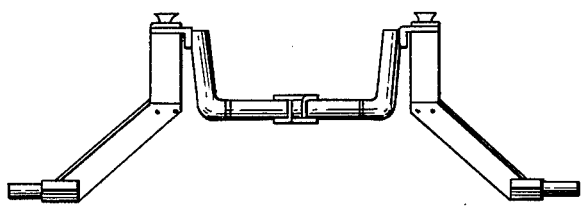
FIG. 9 is a top plan view of FIG. 7.

In FIGS. 7-9 there is shown a leaf spring 11 whose lower end 12 extends obliquely toward the lower guide members.

As may be seen in FIG. 1, a control cable 40 is provided for simultaneously unlocking each of the locks on the coupling hooks. Longitudinal adjustment of the upper guide member 30 is also actuated by the operator through a control cable 41.

OPERATION

Prior to the coupling operation, the leaf spring supporting frame 39 is adjusted to the level of the connection point of the implement. This is accomplished by releasing locking lever 10 and by pivoting the traverse bar 7 upwardly or downwardly. After setting the proper height so that the vertical distance between the coupling hooks of the lower and upper guide members is greater than the vertical distance between the connection points on the implement to be attached, the locking lever 10 is again pivoted into the locked position. The locking surfaces 23, 24 sliding upon each other tightens bolt 20 against the pressure of the spring 26. The indented surfaces 21 and 22 are thus fixed in mutual engagement. The traverse bar 7 now can no longer be pivoted with respect to the leaf springs 1, 2 or 11.

If necessary, the coupling distance between the lower guide members may be adjusted in accordance with the width category of the implement to be attached by loosening lock nut 13 of slide bolt 15. The leaf spring is then pivoted outwardly or inwardly about its pivot pin 17 which in turn pivots in the bore 18 of mounting piece 6. During this pivot movement, the slide bolt 15 is displaced upwardly or downwardly in the guide slot 14 and in the adjustment slot 16 of the leaf spring. When the proper or desired distance between the lower coupling hooks is established, lock nut 13 is then tightened to secure this adjusted position.

The operator of the tractor now drives the tractor in reverse toward the connection points of the implement. The operator actuates control cable 41 to adjust the upper guide member without leaving his seat and extends the upper guide member 30 toward the upper connection point of the implement to be attached. During this procedure, the tractor is backing up until coupling hook 38 of the upper guide member 30 engages and locks into the upper connection point on the implement. During continued backing of the tractor the upper guide member 30 is again telescoped. Lower guide members 36 are lowered and shifted with their coupling hooks below the lower connection points on the implement. By releasing control cable 41 for adjustment of the upper guide member 30 the upper guide member can then be locked in its proper length at this time. The lower members 36 are then lifted through the power drive until the coupling hooks are aligned to the lower connection points by slide surfaces generally provided on the implement. The coupling hooks 37 engage the lower connection pins of the implement and are immediately automatically locked. During this operation, the lower guide members move relatively to the upper guide member which remains coupled until the lower guide members compress the pre-bent leaf springs until the lower coupling hooks 37 are locked in engagement. The implement is now coupled to the tractor and is ready for operation.

During uncoupling of the implement, each of the coupling hooks is unlocked by the operator actuating the control cable 40 from the operator's seat. By subsequent lowering of the lower guide members 36, the coupling hooks 37 are disengaged from the connection pins of the implement.

When it is desired to use the tractor to tow a trailer-like implement or apparatus, the leaf springs may be pivoted inwardly and then subsequently set by the traverse adjustment 29 to extend in the same direction as the ends of the traverse bar 7. Springs are then pivoted upwardly about the annular groove 9 of traverse bar 7 together with the upper guide member 30 and locked on a retaining arrangement of the tractor so that the rear lower space of the tractor connection is completely free for coupling a trailer draw bar and a power takeoff shaft.

Even if the supporting frame 39 and the upper guide member 30 are not folded upwardly and the supporting frame 39 remains connected to the upper and lower guide members, there is still sufficient free space available for coupling a trailer draw bar and a power takeoff shaft. When the tractor towing the trailer goes around curves there will be no contact between the trailer draw bar and the leaf springs of the supporting frame 39.

Thus it can be seen that the present invention discloses a three-point connection for a tractor which connection is simple in structure yet capable of withstanding rough handling commonly encountered in agricultural operations. Further, the connection provides a maximum of free space at the rear of the tractor and no forces are exerted by the leaf springs during the coupling operation.

It will be understood that this invention is susceptible to modification in order to adapt it to different usages and conditions, and accordingly, it is desired to comprehend such modifications within this invention as may fall within the scope of appended claims.

What is claimed is:

1. A three-point connection on a tractor for coupling implements and the like to the tractor comprising an upper guide member and a pair of lower guide members below said upper guide member, a coupling hook on each of said upper and lower guide members, a pair of leaf springs each having a lower end and an upper end, said leaf spring lower ends being connected to said lower guide member coupling hooks and said upper ends being nonpivotally connected to said upper guide member, said leaf springs each being curved such that when a force is applied to an end of a said leaf spring the leaf spring will bend in a predetermined direction.

2. A three-point connection as claimed in claim 1 and further comprising a traverse bar attached to said upper guide member and the upper ends of said leaf springs connected to said traverse bar.

3. A three-point connection as claimed in claim 1 wherein said leaf springs are substantially vertical and spaced from each other a distance not greater than the distance between said lower guide members.

4. A three-point connection as claimed in claim 1 wherein said leaf springs extend obliquely from said upper guide member to said lower guide members.

5. A three-point connection as claimed in claim 4 wherein said leaf springs each comprises a plurality of parallel edges spaced in the plane of bending.

6. A three-point connection as claimed in claim 4 wherein said leaf springs each has a screw-like swing extending laterally to the lower guide members.

7. A three-point connection as claimed in claim 2 and means for mounting said leaf springs on said traverse bar for pivotal movement with respect to each other.

8. A three-point connection as claimed in claim 2 and means for mounting said leaf springs on said traverse bar for pivotal movement about axes parallel to said traverse bar.

9. A three-point connection as claimed in claim 2 and means for step-wise adjusting of said leaf springs horizontally and vertically.

* * * * *